United States Patent Office 2,880,176
Patented Mar. 31, 1959

2,880,176

LUBRICATING GREASE COMPRISING METHYL-CHLOROPHENYL SILICONE POLYMER THICKENED WITH A HIGH MELTING DIAZO COMPOUND

James R. Roach, Beacon, and John P. Dilworth, Brinckerhoff, N.Y., assignors to The Texas Company, New York, N.Y., a corporation of Delaware No Drawing. Application December 24, 1956
Serial No. 630,093

3 Claims. (Cl. 252—49.6)

This invention relates to improved high temperature greases, comprising methylchlorophenyl silicone oils thickened with compounds of a class of high melting diazo compounds.

Lubricating greases thickened with high melting diazo compounds of a class of benzidine derivatives obtained by coupling diazotized benzidine and substituted benzidines with arylacetoacetarylamides and pyrazolones, are disclosed and claimed in copending application Serial No. 631,069 of Joseph F. Lyons, Paul R. Thomas and Norman R. Odell.

We have now found, in accordance with this invention, that greases which are unexpectedly very superior to greases of the prior art in their high temperature properties are obtained by employing certain of the compounds of the class disclosed by Lyons et al. as thickening agents in conjunction with methylchlorophenyl silicone polymer oils as the oil component. Greases are obtained by means of this particular combination of thickening agent and lubricating oil base which meet the high temperature performance test requirement of 500 hours at 450° F. of Military Specification MIL-G-25013 (U.S.A.F.). This requirement has not been met heretofore in grease compositions comprising either different thickening agents or different lubricating oils.

The diazo compounds which are employed as thickening agents in these greases are compounds having the formula

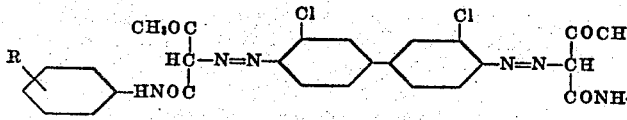

wherein R represents hydrogen or one or more substituent groups chosen from the class consisting of lower alkyl groups and Cl. Particularly suitable compounds of this class are bis(acetyl-N-phenylcarbamylmethyl)4,4'-disazo - 3,3' - dichlorodiphenyl; bis(acetyl - N-o-tolylcarbamylmethyl)4,4'-disazo-3,3'-dichlorodiphenyl; bis(acetyl-N-m-xylylcarbamylmethyl)4,4' - disazo - 3,3' - dichlorodiphenyl; and bis(acetyl - N - 2,5 - dichlorophenylcarbamylmethyl)4,4'-disazo-3,3'-dichlorodiphenyl.

The above compounds are sold commercially as pigments, known as dichlorobenzidine pigments, which are employed chiefly in baking finishes and as rubber pigments. They are prepared by diazotizing 3,3'-dichlorobenzidine, as for example by reaction with nitrous acid in the presence of a strong acid such as hydrochloric acid, and then coupling the diazotized product with acetoacetarylamide or derivative thereof having lower alkyl or chlorine substituents upon the phenyl groups, according to the well-known methods, as for example by the method described in German Patent 251,479 (1912).

The compounds are employed in finely divided form, ordinarily in the form of particles below about one micron in diameter, and preferably below about 0.5 micron in diameter, which may be obtained either by suitably controlling the crystallization conditions during the preparation, or by fine grinding. They may be employed either in pure form or in the form of the so-called reduced toners, wherein the compounds are deposited upon particles of inert inorganic materials such as $SiO_2$, $Al_2O_3$, $TiO_2$, $BaSO_4$, clay, etc. Generally such materials will be present only in minor amounts such as up to about 10 percent by weight, but larger amounts, up to about 25 percent by weight or higher, may be present if desired. In addition, the compounds may contain small amounts, such as up to about 5 percent by weight, of various metal salts, particularly metal chlorides such as zinc chloride, ferric chloride, stannic chloride, or cadmium chloride, which may enter into the crystal structure in some manner which is not entirely understood when such salts are present in the reaction mixture during the crystallization.

The greases of this invention comprise essentially a methylchlorophenyl silicone polymer oil containing thickening agents of the type described above in sufficient amounts to impart at least substantial thickening. Ordinarily the composition will contain from about 5 to about 45 percent by weight of a thickening agent of this type, and preferably about 15 to about 35 percent by weight of such thickening agent, based on the weight of the composition.

The grease preparation may be carried out by merely mixing together the thickener and any additives employed with the silicone oil, employing any convenient means to obtain a thorough dispersion of the thickener and additives in the lubricating oil base, such as by milling in a colloid mill or in a paint mill. The mixing may be carried out at ordinary or at elevated temperatures up to about 300° F. if desired in order to dissolve difficultly soluble additives.

The methylchlorophenyl silicones which are employed in these greases are compounds having the formula

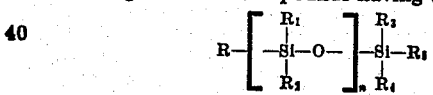

wherein R, $R_1$, $R_2$, $R_3$, $R_4$, and $R_5$ are methyl, phenyl or chlorinated phenyl groups, preferably at least about 35 percent of such groups being methyl groups, and with sufficient chlorinated phenyl groups to give a chlorine content of at least about 3 percent by weight to the polymer, and $n$ is an integer of sufficient size to give a polymer having a viscosity in the lubricating oil viscosity range. The preferred silicone oils are those having a viscosity in the range from about 100 seconds to 600 seconds Saybolt Universal at 100° F., and containing about 4–12 percent by weight of chlorine. A particularly suitable material of this character is the commercial product sold by the General Electric Company under the trade name of Versilube F–50, which has a viscosity of about 180 to 280 seconds Saybolt Universal at 100° F. and contains about 5–10 percent by weight of chlorine.

The methylchlorophenyl silicone polymer may be employed as the sole oil component or it may be employed in admixture with minor amounts of other oils particularly other synthetic oils such as polyethers, polyglycols, diesters or polyesters.

Additives of the usual types may be employed in these greases, such as, for example, oxidation inhibitors, corrosion inhibitors, tackiness agents, extreme pressure agents, and so forth. Iron octoate is a particularly suitable oxidation inhibitor. Other suitable oxidation inhibitors include those of the amine type, such as diphenylamine, alpha-naphthylamine, beta-naphthylamine, p-phenylene diamine, and N,N'diphenyl-p-phenylene diamine. Such additives may be present in amounts from about 0.5 to about 5 percent by weight, based on the weight of the composition. Also, additional thickening agents may be employed, such as other finely divided solids of various types and metal soaps of high molecular weight fatty acids, such as are conventionally employed in lubricating greases.

As an example of a composition of this invention, a grease was prepared consisting of a methylchlorophenyl silicone polymer as the base oil and containing 20 percent by weight, based on the weight of the composition, of bis(acetyl - N - phenylcarbamylmethyl)4,4' - disazo - 3,3'-dichlorodiphenyl. The silicone oil employed was Versilube F-50, having a molecular weight of 3,233, a specific gravity at 20° C./4 of 1.03, a flash point of 575° F., a fire point of 650° F. and containing 33.6 percent by weight of silica and 7.18 percent of chlorine by analysis. The diazo compound was a commercial pigment in the form of particles 0.01–0.15 micron in diameter and contained 1.31 percent by weight of zinc in the form of water soluble zinc salt. The grease preparation was carried out by mixing these materials in the indicated proportions in a laboratory beaker and then passing the mixture through a Premier Colloid Mill in one pass at an 0.002 inch clearance. A soft smooth yellow grease was obtained having an ASTM worked penetration at 77° F. of 345 and a dropping point of over 500° F.

The following table shows the results obtained upon the above grease in the high temperature performance test in comparison with those obtained upon a grease thickened with a different organic solid thickener and also greases containing these thickeners in a different silicone oil, which was a methylphenyl silicone polymer sold by Dow Corning, Inc. under the trade name of DC-550.

TABLE I

*High temperature performance test*

| Thickener | Silicone Oil | Hours to Failure | |
|---|---|---|---|
| | | 400° F. | 450° F. |
| bis(acetyl-N-phenylcarbamylmethyl)4,4'-disazo-3,3'-dichlorodiphenyl | Methylchlorophenyl silicone polymer. | 1,843 | 765 |
| Indigo | do | 316 | |
| bis(acetyl-N-phenylcarbamylmethyl)4,4'-disazo-3,3'-dichlorodiphenyl | Methylphenyl silicone polymer. | 968 | |
| Indigo | do | 378 | |

The high temperature performance test of the foregoing table is a test for determining the performance characteristics of greases in antifriction bearings at elevated temperatures and high rotative speeds. The test unit consists essentially of a steel spindle supported on ball bearings in an electrically heated housing and driven by an electric motor connected into an electric circuit containing a low amperage fuse 0.1 ampere below that required for full load running. The bearings are Norma-Hoffman ABEC No. 3 grade, and are mounted on a spindle approximately 5⅞ inches apart. A thrust load of 17.5 pounds is applied to the bearings. One bearing is used for test purposes and the second bearing, which is not heated, is used as a guide bearing. The test consists in operating the test bearing for twenty-four hours at 10,000 r.p.m. and at a temperature of from 250° F. to 450° F. followed by a shutdown and cooling period of two hours, and repeating this cycle until the lubricant fails, which is indicated by rupture of the low amperage fuse in the motor circuit. In carrying out the test at 400° F. or above, Marlin Rockwell special heat treated high speed tool steel bearings with silver plated bronze retainers are used. In starting up the test, three grams of the test grease are charged to the test bearing and worked into and around the races and balls. The bearing is next rotated both clockwise and counterclockwise for one minute each at 200 r.p.m. and assembled into the test unit. The heaters and the motor are then started and the test bearing brought up to the test temperature as rapidly as possible, which requires 1.0 to 1.25 hours, while the spindle is rotated at a speed of 10,000 r.p.m. After 24 hours of operation the heaters and motors are shut off for 2 hours, during which the temperature of the test bearing drops to a minimum of 120–130° F. The total hours of operation, excluding the two hour shutdown periods, to the failure point is recorded as the "hours to failure."

As shown by Table I, the greases representative of the greases of this invention ran for well over the 500 hours at 450° F. in the high temperature performance test as required by MIL–G–25013. The data obtained at 400° F. in the test show that this grease ran almost twice as long as did the grease containing the same thickener in a methylphenyl silicone polymer oil as the oil base, and several times as long as the indigo thickened greases containing the same silicone oils. In contrast to the effect obtained with the dichlorobenzidine yellow thickener, no advantage was obtained by employing a methylchlorophenyl silicone polymer oil in conjunction with an indigo thickener over the ordinary methylphenyl silicone oil.

In addition to the very exceptional high temperature performance properties shown above, the greases of our invention have the other lubricating properties required of a very superior high temperature grease, including excellent working stability, oxidation resistance and water resistance, as well as low temperature torques of <1 seconds at −80° F.

Obviously many modifications and variations of the invention, as hereinbefore set forth, may be made without departing from the spirit and scope thereof, and therefore, only such limitations should be imposed as are indicated in the appended claims.

We claim:
1. A lubricating grease consisting essentially of a methylchlorophenyl silicone polymer oil of lubricating characteristics thickened to a grease consistency by a compound having the formula

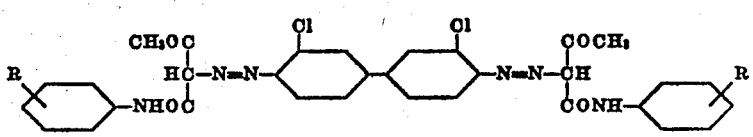

wherein R represents one or more radicals chosen from the class consisting of hydrogen, lower alkyl groups and chlorine.

2. The composition according to claim 1 wherein the said methylchlorophenyl silicone polymer oil has a viscosity in about the range 100–600 seconds SU at 100° F. and contains about 4–12 percent by weight of chlorine.

3. A lubricating grease consisting essentially of methyl-chlorophenyl silicone polymer oil thickened to a grease consistency with about 15-35 percent by weight, based on the weight of the composition, of bis(acetyl-N-phenyl-carbamylmethyl)4,4'-disazo-3,3'-dichlorodiphenyl, said methylchlorophenyl silicone polymer oil having a viscosity of 180-280 seconds SU at 100° F. and a chlorine content of 5-10 percent by weight.

References Cited in the file of this patent

UNITED STATES PATENTS

| | | |
|---|---|---|
| 1,932,577 | Eichwede et al. | Oct. 31, 1933 |
| 2,361,568 | Reynolds | Oct. 31, 1944 |
| 2,604,469 | Herrmann | July 22, 1952 |
| 2,791,560 | Dilworth et al. | May 7, 1957 |